UNITED STATES PATENT OFFICE.

JOSEPH SINGER, OF CHICAGO, ILLINOIS.

IMPROVEMENT IN THE MANUFACTURE OF BEER FROM MALT AND INDIAN MEAL.

Specification forming part of Letters Patent No. 39,685, dated August 25, 1863.

*To all whom it may concern:*

Be it known that I, JOSEPH SINGER, of Chicago, in the county of Cook and State of Illinois, have invented a new and useful Improvement in the Manufacture of Beer; and I do hereby declare that the following is a full, clear, and exact description thereof.

The object of this invention and improvement in making beer is to produce as much beer from a certain quantity of raw corn as from a similar quantity of barley-malt by imparting to raw Indian corn all the properties of brewers' malt, using in the process but a single mashing-tub, and effecting the desired end in a very simple manner without extra expense or labor, all as will be hereinafter described.

To enable others skilled in the art to fully understand my process of making beer, I will describe the operation thereof.

The main and peculiar features of my process are that I take equal parts of corn and barley-malt and use but a single mashing-tube for both substances.

In order to brew beer from corn it is necessary to use with it a definite proportion of barley-malt and water and to raise the temperature of this mixture to a certain degree to produce sugar. The ingredients from which the sugar is generated is the starch contained in the corn, which substance is transformed into sugar by the peculiar action of diastase contained in the malt. This action of the diastase is so energetic that one part admixed to two thousand parts of starch and seven thousand parts of water is sufficient to convert the starch into sugar, which conversion takes place most rapidly and completely at a temperature of 150° or 152° Fahrenheit.

In the ordinary brewing process there are for every one hundred barrels of beer two hundred bushels of barley-malt required. I use in my process for the same quantity of beer one hundred bushels of coarsely-ground malt and one hundred bushels of finely-ground corn. I pour into the mashing-tub nine hundred gallons of water at a temperature of 150° Fahrenheit, then start the stirring, and introduce slowly the malt and corn. The stirring must be continued for about three-quarters of an hour, after which the mash is allowed to settle, and in the course of two hours it will be found that the starch has been converted by the action of the diastase into dextrine and sugar. The clear infusion of "sweetwort," as it is now called, is drawn off into the kettle; and in order to completely exhaust the malt and corn residue yet remaining in the mash-tub I mix them a second time with water, using now fifteen hundred or sixteen hundred and fifty gallons of water of 185° or 195° Fahrenheit, and after stirring again for one quarter of an hour I allow this mixture to stand one-half or three-quarters of an hour, and then add the clear infusion to the wort already contained in the kettle, and proceed now with the two united liquids as usual, in as far as the further treatment does not differ from the ordinary brewing process.

From this description it will be seen that I completely exhaust the residue left in the mash-tub after the first drawing, depriving it in this second mashing of all its saccharine properties and employing a higher degree of temperature than was necessary in the first mashing to convert the starch into dextrine and sugar.

Having thus described my invention, what I claim as new, and desire to secure by Letters Patent, is—

The within-described process of making beer from ground corn and barley-malt mixed together in one tub in the relative proportions and at the temperatures described.

JOSEPH SINGER.

Witnesses:
 GODFREY DEHEZ,
 ERNST TRUSSING.